Dec. 20, 1955      W. F. SHURTS      2,727,601

VEHICLE POWER TRANSMISSION

Filed Oct. 17, 1950      7 Sheets-Sheet 1

Fig. 1.

Inventor:
Wilbur F. Shurts.
By John W. Darley
Attorney.

Dec. 20, 1955 W. F. SHURTS 2,727,601
VEHICLE POWER TRANSMISSION
Filed Oct. 17, 1950 7 Sheets-Sheet 5

Inventor,
Wilbur F. Shurts

By John W Darley
Attorney.

Dec. 20, 1955  N. F. SHURTS  2,727,601
VEHICLE POWER TRANSMISSION
Filed Oct. 17, 1950  7 Sheets-Sheet 6

Fig. 8.

Inventor.
Wilbur F. Shurts.
By John W. Darley
Attorney.

Dec. 20, 1955  W. F. SHURTS  2,727,601
VEHICLE POWER TRANSMISSION
Filed Oct. 17, 1950  7 Sheets-Sheet 7

Inventor.
Wilbur F. Shurts
By John W. Darley
Attorney.

United States Patent Office 2,727,601
Patented Dec. 20, 1955

2,727,601

VEHICLE POWER TRANSMISSION

Wilbur F. Shurts, Rockford, Ill., assignor to Twin Disc Clutch Company, Racine, Wis., a corporation of Wisconsin Application October 17, 1950, Serial No. 190,527

6 Claims. (Cl. 192—3.2)

My invention relates to a vehicle power transmission including a hydraulic torque converter in which the transmission is conditioned to transmit power to a selective gear transmission of the clash type either hydraulically through the converter or direct.

A characteristic use of such a power transmission is in truck service where varying road conditions in relation to the total load require from time to time the selection of a proper gear ratio. To secure satisfactory gear shifting, it is important that the interruption of power flow through the transmission be not only rapid and complete, but effected through mechanism whose control enables the driver to keep one hand on the steering wheel with the other hand available to actuate the gear shift lever.

It is therefore one object of my invention to devise a vehicular power transmission including a hydraulic torque converter which is arranged for selective hydraulic or direct drive therethrough and having means adapted to temporarily interrupt power flow under either driving condition to facilitate gear shifting in a connected gear transmission.

A further object is to provide a transmission of the character indicated in which the driving conditions are effected by selective hydraulically actuated clutches, either of which can be temporarily shifted from engagement to disengagement under the control of a foot pedal and returned to engagement when the pedal is released.

A further object is to provide a transmission as above in which the clutches are conditioned for simultaneous engagement to thereby secure a dual braking action when the vehicle is descending a hill derived from the engine compression and the work required to rotate the impeller member of the converter.

These and further objects of the invention will be set forth in the following specification, reference being had to the accompanying drawings, and the novel means by which said objects are effectuated will be defitely pointed out in the claims.

Figure 1:
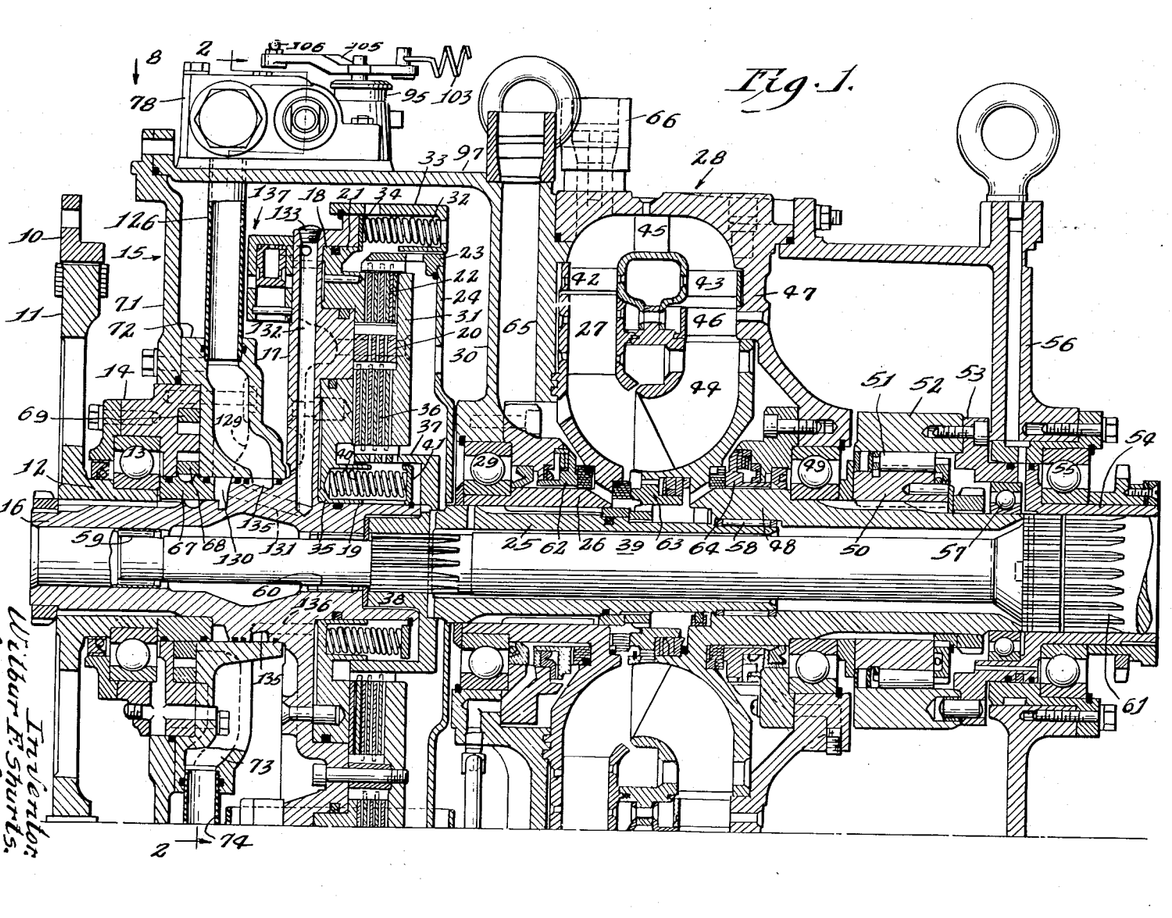
Fig. 1 is a fragmentary, sectional elevation of the transmission as taken along the irregular line 1—1 in Fig. 2, the clutches being shown in disengaged position.

Referring to Fig. 1, the numeral 10 designates a driving ring that is secured to an engine flywheel (not shown) or generally any power source and which has toothed, driving connection with a spider ring 11 having a hub 12 which is journaled in a bearing 13 carried by a pump casing 14 that is attached to a housing 15 which encloses the transmission.

The hub 12 has spline connection with the outer end of a sleeve 16 which extends within the housing 15 and has integrally formed therewith or otherwise attached thereto a carrier disk 17 whose right face, as viewed in Fig. 1, is recessed to provide concentric annular cylinders 18 and 19, the former being disposed radially outward of the latter. The disk 17 forms the closed ends of the cylinders and extending from the disk beyond the open ends of and between the cylinders is an externally and internally splined or toothed annulus 20.

An annular piston 21 is slidably mounted in the cylinder 18 in actuating relation to a plurality of clutch plates 22, alternate plates having toothed and sliding engagement with the outer splined surface of the annulus 20 while the intervening plates are similarly engaged with a toothed shell 23 to which is connected the outer periphery of a connector ring 24 whose inner periphery is attached to a sleeve 25 having an external spline connection with the hub 26 forming part of the impeller 27 of a hydraulic torque converter 28 of the stationary housing type. The impeller hub 26 is journaled in a bearing 29 carried by a transverse wall 30 within the housing 15 and which wall constitutes the forward, fixed, radial wall of the converter. The plates 22 are engaged by the piston 21 against the outer portion of an abutment ring 31 whose central portion is secured to the annulus 20. The piston 21, plates 22 and the outer portion of the ring 31 constitute the hydraulic drive clutch which, for convenience, will hereinafter be referred to as the clutch 22, and release of this clutch, when the actuating pressure is removed, is effected by a plurality of helical springs 32 whose opposite ends respectively abut a cage 33 carried by the disk 17 and a ring 34 carried by and constituting an annular, outward extension of the piston 21.

An annular piston 35 is slidable in the cylinder 19 and is operably related to a plurality of clutch plates 36, alternate plates having toothed and sliding engagement with the inner splined surface of the annulus 20 while the intervening plates have similar engagement with a toothed shell 37 having a hub 38 through which an intermediate shaft 39 extends and has spline connection therewith. The plates 36 are engaged by the piston 35 against the inner portion of the abutment ring 31 and release of these plates is effected by a plurality of helical springs 40 whose opposite ends respectively abut the piston 35 and a ring 41 carried by the sleeve 16. The piston 35, plates 36 and the inner portion of the abutment ring 31 form the direct drive clutch of the transmission and, for convenience, will hereinafter be referred to as the clutch 36.

The outlet and inlet ends of the converter impeller 27 are operably related to connected turbines 42, 43 and 44 constituting first, second and third stages of the converter which additionally includes reaction members 45 and 46 positioned, respectively, between the turbines 42 and 43 and the turbines 43 and 44. The member 45 is fast to the stationary top wall of the converter housing while the member 46 is secured to another transverse wall 47 within the housing 15, a portion of the latter wall also serving as the rear, fixed, radial wall of the converter. The output turbine 44 includes a sleeve hub 48 journaled in a bearing 46 carried by the wall 47 and has spline connection with the inner race 50 of an overrunning clutch 51 whose outer race 52 is connected to an annular, outward extension 53 forming part of an internally splined sleeve 54 that is journaled in a bearing 55 carried by the housing rear wall 56. The right end of the sleeve 48 is piloted in a bearing 57 interposed therebetween and the sleeve extension 53 and a needle bearing 58 is positioned between the overlapping portions of the sleeves 25 and 48. The left end of the intermediate shaft 39 extends through spaced needle bearings 59 and 60 in the sleeve 16 while the other part of the shaft extends coaxially through and in spaced relation to the sleeves 25 and 48. The right end of the shaft 39 has spline connection with the sleeve 54 and sufficient length is provided in this sleeve to receive one end of a shaft 61 which constitutes the output shaft of the transmission shown in Fig. 1 and the input shaft of a clash gear transmission (not shown). Leakage from the converter 28 is prevented by sealing members 62, 63 and 64 positioned as shown in Fig. 1 and liquid is supplied to the converter through a passage 65 in the wall 30 and discharged through a connection 66, all forming part of a hydraulic system normally including a cooler and an engine driven pump. None of the latter features form any part of the invention and hence are not illustrated.

Figure 2:
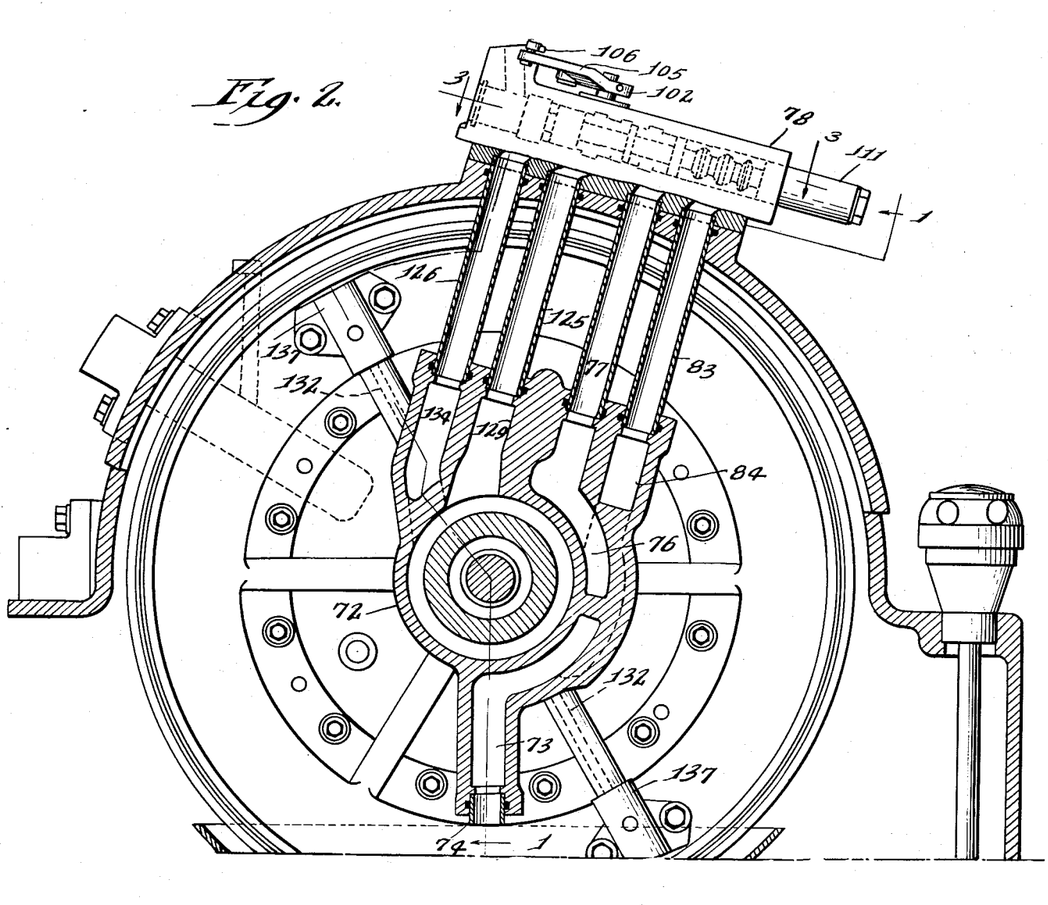
Fig. 2 is a fragmentary section along the line 2—2 in Fig. 1.
Figure 13:
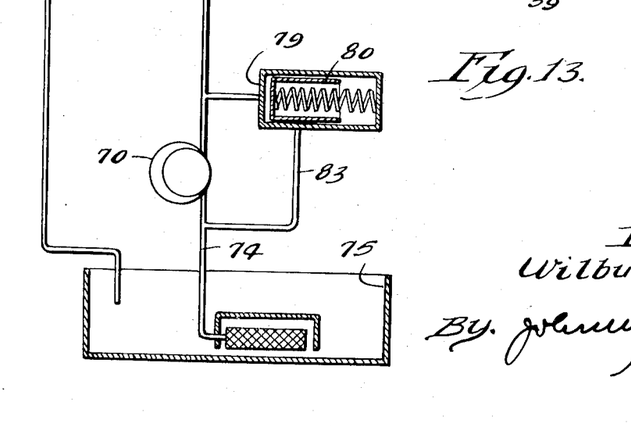
Fig. 13 is a schematic layout of the hydraulic system including the clutches, engine driven pump, selector and master valves, and the sump which would be provided by the lower part of the transmission housing.

Selective hydraulic actuation of the hydraulic and direct drive clutches is accomplished by the following instrumentalities (see Figs. 1, 2 and 13). A spacer ring 67 is keyed to the sleeve 16 in sealing relation to the inner periphery of the pump casing 14 and keyed to the ring 67 within the casing 14 is a pump gear 68 that is eccentrically related in the customary manner to an internal gear 69 also mounted within the casing 14. The casing 14, and gears 68 and 69 form a characteristic internal gear pump generally designated by the numeral 70 in Fig. 13.

Encircling the sleeve 16 and bolted to the inner face of the housing forward wall 71 and abutting the inner face of the pump casing 14 so that it partially encloses the pump gears 68 and 69 is a manifold 72 (see Figs. 1 and 2). The underside of the manifold includes a branch 73 which connects at its lower end by way of a pipe 74 with a sump 75 generally provided by the lower part of the transmission housing 15 and at its opposite end with the intake or suction side of the pump 70. The discharge of the pump 70 connects with a manifold branch 76 which in turn communicates with a pipe 77 whose upper end connects with a casing 78 which encloses a pressure regulator valve for determining the pressure of the actuating liquid for the clutches and a selector valve for determining the actuation of the clutches.

Specifically, the upper or delivery end of the pipe 77 communicates with the inlet port 79 of a pressure regulating valve 80 (see Figs. 3 and 13) whose discharge port 81 connects through a passage 82 in the casing 78 and oil thus discharged is returned through a pipe 83 (see Fig. 2) and a connecting manifold branch 84 to the branch 73 and thence to the suction side of the pump 70 or it may flow directly to the sump 75.

Figure 7:
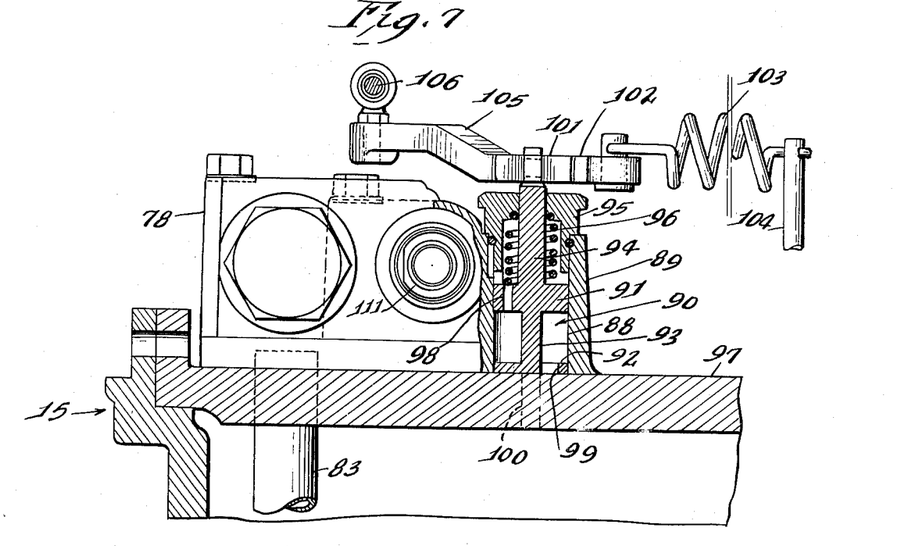
Fig. 7 is a fragmentary section of the selector valve along the line 7—7 in Fig. 3 showing the associated master valve for temporarily denying pressure to either the hydraulic or direct drive clutch during gear shifting.

The upper end of the pipe 77 also communicates with a chamber 85 in the lower part of the casing 78 and this chamber connects through a passage 86 (see Fig. 3) with a chamber 87 that always contains oil under pressure while the power source is operating. The delivery end of the chamber 87 communicates with a cylindrical chamber 88 provided in an offset portion 89 forming part of the casing 78 (see Fig. 7). Rockable in the chamber 88 is a master valve 90 comprising spaced, upper and lower disks 91 and 92, respectively, which are connected by a web 93 that is aligned and symmetrical with the axis of the valve 90. The width of the web 93 is such that it has a substantially leak tight fit with the chamber 88, but its thickness is substantially less than the diameter of this chamber and the spacing of the disks 91 and 92 is such as to insure free admission to the chamber 88 of oil from the chamber 87 when the valve 90 is in the position shown in Fig. 3. The valve 90 includes a stem 94 that extends upwardly from the disk 91 through a cap 95 that closes the top of the casing portion 89 and interposed between the cap 95 and disk 91 is a spring 96 that encircles the stem and maintains the disk 92 in seating contact with the top wall 97 of the housing 15.

A passage 98 extends through the disk 91 to enable pressure in the chamber 88 to be applied to the space above the disk 91 and a passage 99 also extends through the disk 92. When the valve 90 is in the position shown in Figs. 3 and 7, the chamber 88 is open to the flow of oil therethrough, but when the valve is rocked 90° counter-clockwise, as viewed in Fig. 3, the web 93 closes flow through the chamber 88 and the passage 99 is registered with a passage 100 that extends through the wall 97 for communication with the sump 75, all for purposes presently explained.

Figure 8:
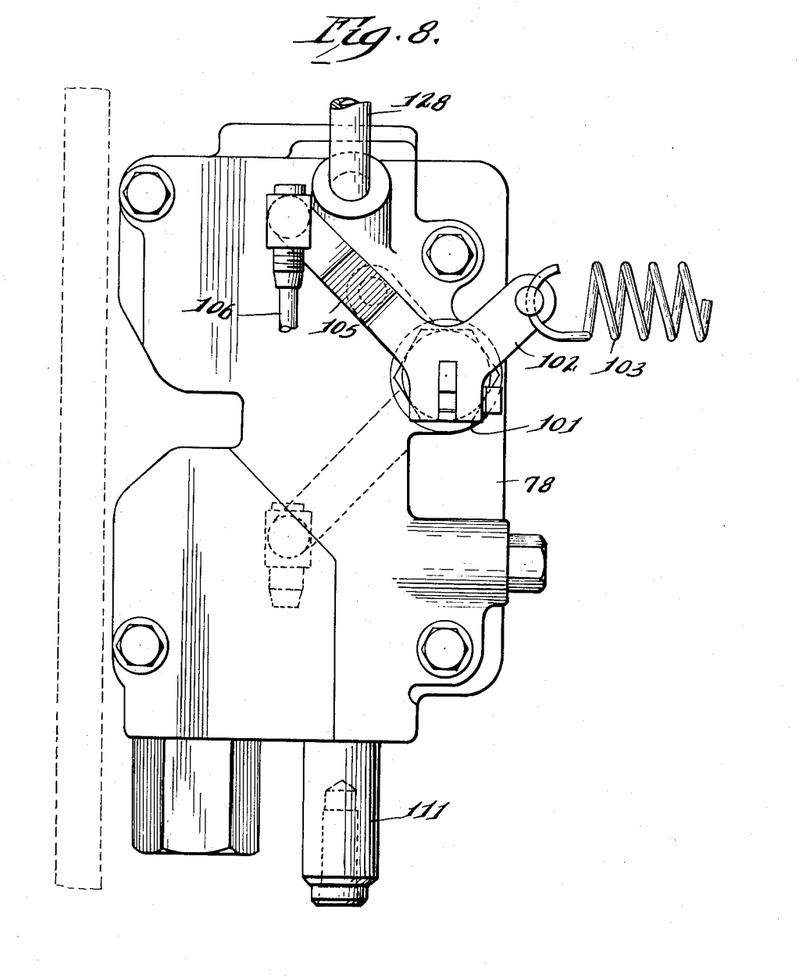
Fig. 8 is a plan view of the selector valve, as viewed in the direction of the arrow 8 in Fig. 1, showing the lever actuator for the master valve.
Figure 9:
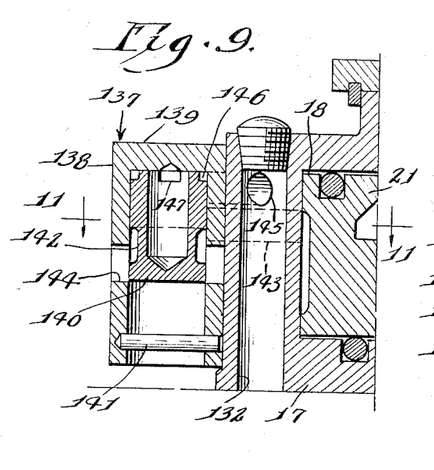
Figs. 9 and 10 are enlarged, sectional elevations of the dump valve employed for the outer or hydraulic drive clutch, the former showing the valve in dumping position to permit a disengagement of this clutch and the latter showing the valve shifted by pump pressure to admit the actuating oil to the cylinder of the clutch.

Externally of the cap 95, the valve stem 94 (see Figs. 7, 8 and 13) connects to a lever 101 having an arm 102 to which is attached one end of a spring 103 whose other end is fastened to a convenient anchorage 104. The spring 103 biases the valve 90 to the open position shown in Fig. 3. The other lever arm 105 connects by a link 106 with a foot operated pedal 107 located conveniently for the driver of the vehicle.

Figure 3:
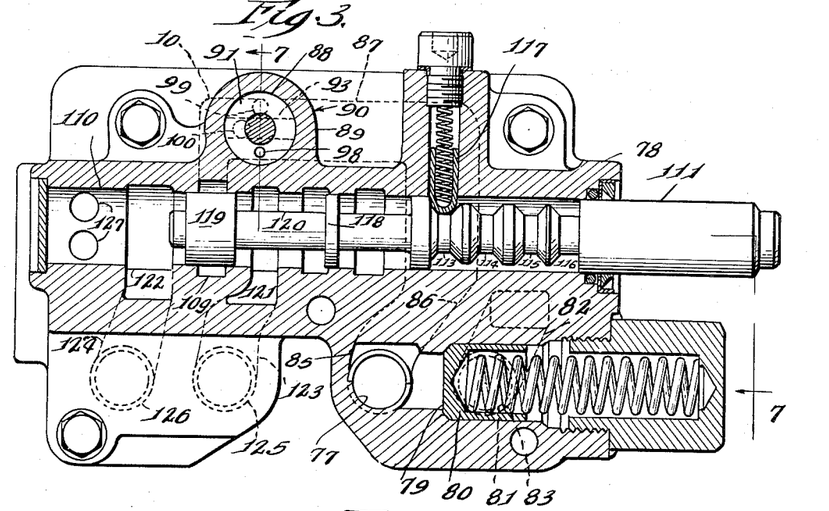
Figs. 3, 4, 5 and 6 are sectional views of the selector valve taken along the line 3—3 in Fig. 2 showing, respectively, positions of the valve determining a disengagement of the hydraulic and direct drive clutches or a neutral position, an engagement of the hydraulic drive clutch only, an engagement of the direct drive clutch only, and an engagement of both clutches to obtain the combined braking effect of the engine and converter when the vehicle is descending a grade.
Figure 5:
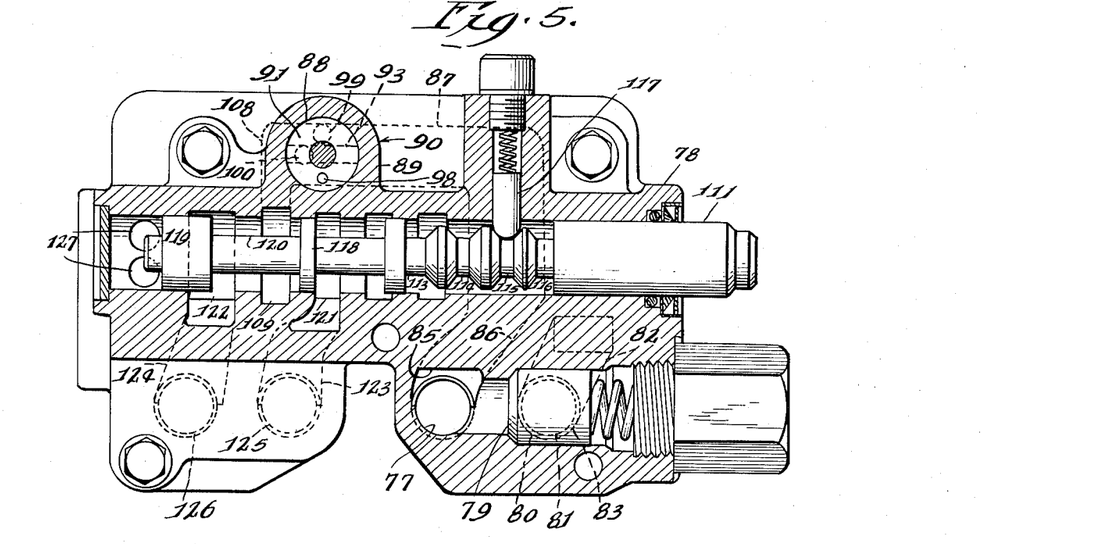

The delivery side of the chamber 88 connects through a passage 108 (see Fig. 5) with an annular port 109 that surrounds a bore 110 in the casing 78. Slidable in the bore 110 is a valve stem 111 whose right end, as viewed in Figs. 3 and 13, is connected to a pivoted actuating handle 112, also convenient to the driver, and whereby the stem may be reciprocated in the bore. For the purpose of holding the valve stem in any selected position, it includes annular grooves 113, 114, 115 and 116 spaced axially thereof and arranged to selectively engage a spring actuated detent 117, the grooves respectively determining valve stem positions corresponding to neutral, hydraulic drive, direct drive and braking conditions of the transmission.

The valve stem 111 includes piston valves 118 and 119 which closely fit the bore 110 and are spaced axially by a reduced neck 120 and these valves and stem comprise a selector valve. Annular ports 121 and 122 surround the bore 110 on opposite sides of the port 109 and communicate with passages 123 and 124 in the casing 78 which in turn connect with the outer ends of pipes 125 and 126, all respectively. Also communicating with the bore 110 to the left of the port 122, as viewed in Fig. 3, are exhaust ports 127—127 which connect by a pipe 128 with the sump 75 (see Fig. 13). In this figure also, the passage 100, through which discharge from the auxiliary valve 90 occurs under certain conditions, is shown as connected to the pipe 128, but this is to show a flow relation only since the passage 100 is located in the housing top wall 97.

The inner end of the pipe 125 communicates with the outer end of a manifold branch 129 (see Figs. 1 and 2) whose inner end constantly communicates with an annular groove 130 defined by an annular formation in the sleeve 16 and the adjacent end of the spacer ring 67 and the groove 130 in turn connects through one or more passages 131 in the sleeve 16 with the inner ends of a plurality of radial passages 132 provided in the carrier disk 17. As shown in Fig. 2, two passages 132 are employed in opposed relation and their outer ends are closed by plugs 133. The inner end of the pipe 126 connects with the outer end of manifold branch 134 whose inner end constantly connects with an annular groove 135 provided on the outer surface of the sleeve 16 and which in turn connects through one or more longitudinal passages 136 with the direct drive clutch cylinder 19.

Oil is supplied through the passages 132 to the hydraulic drive clutch cylinder 18 under the control of a dump valve for each passage generally indicated by the numeral 137 in Figs. 1 and 2 and illustrated in detail in Figs. 9 to 12, inclusive, to which reference will now be made. The valve includes a casing 138 that is secured to the carrier disk 17 adjacent the periphery thereof, being closed at the outer end by a wall 139 and open at its inner end. Slidable in the casing 138 is a piston valve 140, closed and open at its inner and outer ends, respectively, whose movements outwardly are limited by the wall 139 and inwardly by a pin 141 bridged across the bore of the casing. An annular channel 142, provided around the inner end of the valve 140, serves, in the dumping position, shown in Fig. 9, as a means of communication between a passage 143 leading from the hydraulic drive clutch cylinder 18 through the disk 17 and casing 138 and a plurality of exhaust ports 144 in the casing which communicate with the sump 75. Oil is delivered to the cylinder 18 through one end of a passage 145 which connects with the passage 132 adjacent the outer end thereof and which extends through the carrier disk 17 and casing 138 for connection with the outer end of the bore of the casing 138, the piston valve 140 including an annular groove 146 which communicates with notches 147 to insure access of the oil to the outer end and interior of the piston valve. When the pump pressure is effective in the passage 132, it shifts the valve 140 inward to the position shown in Fig. 10, in which the passages 145 and 143 are placed in communication and the valve 140 masks the exhaust ports 144.

Figure 10:
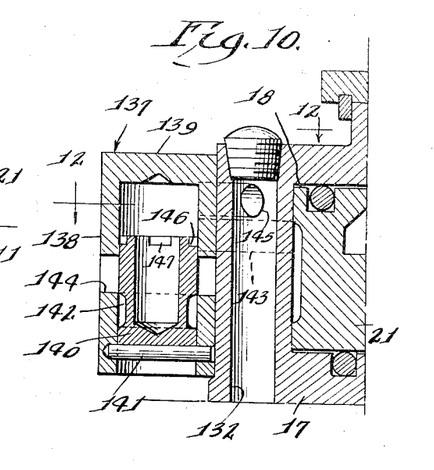
Figure 11:
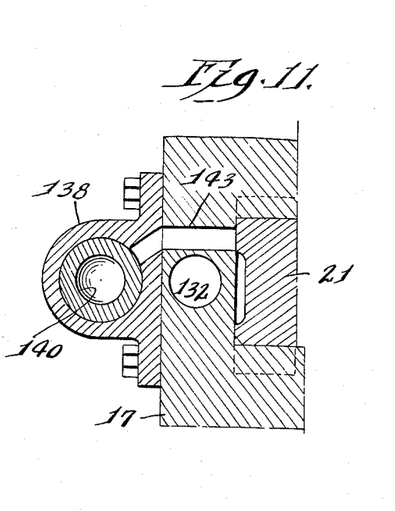
Figs. 11 and 12 are sections along the lines 11—11 and 12—12 in Figs. 9 and 10, respectively.
Figure 12:
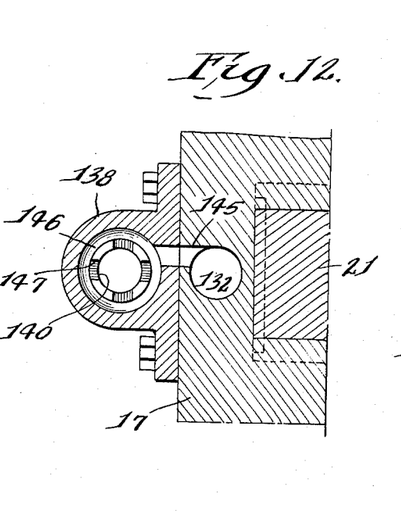

The dump valve operates on the principle of pump pressure shifting the piston valve 140 to the position shown in Fig. 10 to thereby engage the hydraulic drive clutch, but when pump pressure to this clutch is interruped, then, at any speed of the power source, the centrifugal force due to the weight of the piston valve 140 is greater than that due to the weight of the column of oil in the passage 132. Under the latter condition, therefore, the valve shifts outwardly to the quick dumping position shown in Fig. 9 whereupon the springs 32 release the clutch 22. Due to the smaller radius of the direct drive clutch 36, dump valves are not necessary therefore since the release springs 40 effectively counteract the centrifugal action on the relatively small masses of oil en route to the cylinder for this clutch when the pump pressure is interrupted. If this interruption occurs by reason of a shift from direct to hydraulic drive, the direct drive clutch cylinder 19 dumps through the ports 127 (see Figs. 4 and 5), but if the interruption is due to the closing of the master valve 90 while in direct drive owing to the necessity for making a gear shift, the direct drive clutch cylinder 19 dumps through the valve 90 as will be presently described.

In describing the operation of the transmission, it will be assumed that the power source is idling, thus driving the pump 70 and the carrier disk 17, that the valve stem 111 and master valve 90 are in the neutral and open positions, respectively, shown in Fig. 3, and that the associated clash gear transmission (not shown) is also in neutral. The piston valve 119 then masks the annular port 109 so that pump pressure is denied to the outer ends of the pipes 125 and 126 and hence, respectively, to the hydraulic and direct drive clutch cylinders 22 and 36. At the same time, the piston valve 119 also permits communication between the pipe 126 and the exhaust ports 127, while the piston valve 140 occupies the dumping position shown in Figs. 1 and 9, and the clutches 22 and 36 are disengaged.

Figure 4:
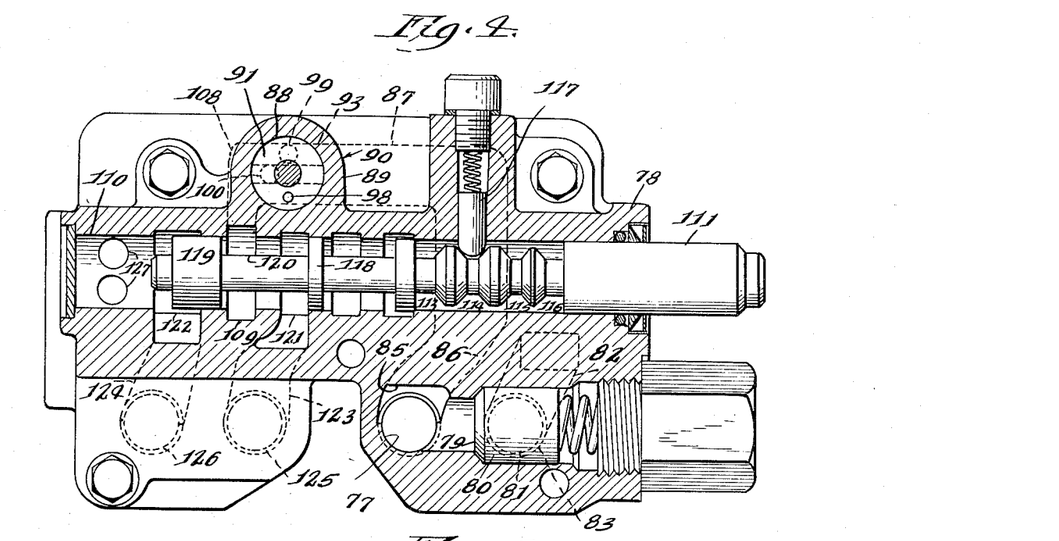

To start the vehicle from rest, advantage is ordinarily taken of the high starting torque and capacity for rapid, smooth acceleration afforded by the converter 28 and to drive through this unit, the valve stem 111 is shifted to the position shown in Fig. 4. The piston valve 119 then uncovers the port 109 but only partially masks the port 122 while still denying pump pressure to the latter port, and the piston valve 118 directs the pump pressure through the port 121 and thence to the pipe 125. Therefore, the direct drive clutch 36 remains disengaged and pump pressure is transmitted through the pipe and passages described above, including the dump valve 137 whose piston 140 then occupies the position shown in Fig. 10, to the clutch cylinder 18 to thereby engage the hydraulic drive clutch 22. Engine power is then transmitted through the converter 28 to the sleeve 54 and the gear transmission input shaft 61 which constantly connects in the usual way with the countershaft of the gear transmission which is then in neutral. This countershaft is thus started rotating.

However, before the gear transmission can be shifted into low gear, power flow to the countershaft must be temporarily interrupted for the same reasons as obtain in the usual vehicle equipped with a foot operated, friction clutch. In the present instance, this power interruption is effected through depression of the foot pedal 107 by the driver which rotates the master valve 90 counterclockwise through an angle of 90°, i. e., to a position in which the web 93 blocks pump pressure flow to the hydraulic drive clutch cylinder 18. This cylinder then dumps quickly through the dump valves 137 and the hydraulic drive clutch is disengaged. The driver then engages the first speed gears in the usual way and releases the foot pedal 107 whereupon the valve 90 returns to the open position and admits pressure to the hydraulic drive clutch 22 to thereby complete the power train to the vehicle rear axle.

An alternative method is to mesh the first speed gears before engaging the hydraulic drive clutch if the positions of the gears permit. Then this clutch can be engaged without necessitating the operation of the master valve. Successive gear shifts are effected in the same manner until the gear transmission is in high gear, each shift requiring the closing of the master valve 90. When the gear transmission is in high gear, or in any lower gear ratio if desired, power flow can be changed from hydraulic to direct by shifting the valve stem 111 to the position shown in Fig. 5. The piston valve 118 is then located between the ports 109 and 121, thus denying pressure to the hydraulic drive cylinder 18 which dumps quickly through the valve 137 to thereby enable the hydraulic drive clutch 22 to disengage. At the same time, the piston valve 119 masks the discharge ports 127 and admits pump pressure to the pipe 126 and thence through the passages above described to the direct drive cylinder 19 to thereby engage the associated clutch 36. With the hydraulic drive clutch 22 disengaged, the converter impeller 27 stops rotating, the converter turbines 42, 43 and 44 are freed from connection to the sleeve 54 through the overrunning clutch 51, and the direct drive clutch 36 transmits engine power through the intermediate shaft 39 to the output shaft 61.

If it becomes necessary to shift gears while in direct drive, the master valve 90 is rotated as before to block pump flow to the direct clutch cylinder 19. This rotation registers the passages 99 and 100 on the direct drive clutch side of the web 93 so that the direct drive clutch cylinder 19 is placed in communication with the sump 75 through the passages 99 and 100 and dumps quickly to permit the disengagement of the direct drive clutch 36. The gear shift is then made and the master valve 90 is opened to secure the reengagement of the direct drive clutch 36.

If load conditions require a change from direct to hydraulic drive, the valve stem 111 is shifted to the position shown in Fig. 4, thus interrupting pump pressure to the direct drive clutch 36 and connecting the cylinder thereof to the sump through the exhaust ports 127, while the piston valve 118 permits the admission of pump pressure to the hydraulic drive clutch cylinder 18. Accordingly, the direct drive clutch 36 is disengaged and the hydraulic drive clutch 22 is engaged.

Figure 6:
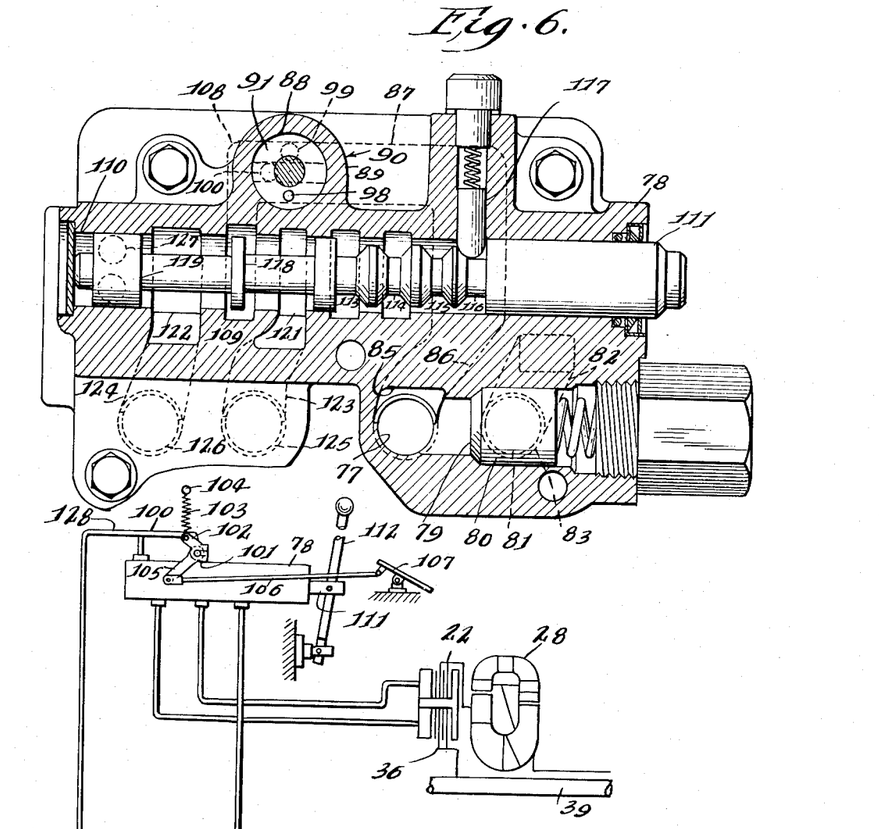

An important feature of the invention is the ability to condition the transmission so as to obtain the combined braking effect of the engine and the hydraulic torque converter when the vehicle is descending a hill. To achieve this result, the valve stem 111 is shifted from whatever position it occupied previously to that shown in Fig. 6 wherein the piston valve 118 is symmetrical with reference to the port 109 whose width is substantially greater than that of the valve 118 so that the latter does not interfere with flow through this port, while the piston valve 119 masks the exhaust ports 127 and lies to the left of the port 122. The hydraulic and direct drive clutches 22 and 36 are therefore engaged at the same time. Hence, with the engine throttle in idling position and the vehicle descending a hill, the output shaft 61 drives the engine as well as the converter impeller 27 to thereby secure the braking benefit of the engine compression and that derived from the operation of the converter up to its full horsepower capacity.

This transmission renders available for vehicles equipped with clash gear transmissions the operating advantages of a hydraulic torque converter drive under conditions permitting a selection of direct or hydraulic drive and the ability to quickly shift gears in either drive. The equipment is particularly desirable for vehicles engaged in heavy duty service. It eliminates the usual clutch pedal in favor of a pedal comparable to the accelerator pedal for controlling the master valve 90. Hence, in shifting gears, there is no necessity for the driver to learn a new routine, other than the occasional actuation of the valve stem 111. Otherwise, during shifting, he keeps one hand on the steering wheel and grips the gear shift lever as always and works the pedal 107 with his left foot.

I claim:

1. In a transmission for a vehicle powered by an engine of the compression type, the combination of a driven member, a hydraulic torque converter including an impeller, a multistage turbine and permanently stationary reaction means operatively related to the turbine, an overrunning clutch interposed between the turbine and driven member, an intermediate shaft connected to the driven member, a common member connectible to the engine, first and second hydraulically actuated clutches carried by the common member for respectively connecting the engine to the impeller and the intermediate shaft to provide hydraulic and direct drive, and selector valve means adapted in one position to direct actuating fluid to the first clutch for engagement thereof and deny actuating fluid to the second clutch, in another position to direct actuating fluid to the second clutch for engagement thereof and deny actuating fluid to the first clutch, and in another position to direct actuating fluid to both clutches to engage the same whereby is obtained a braking effect due to the engine compression and the operation of the converter when the driven member is applying power to the intermediate shaft.

2. In a transmission for a vehicle powered by an engine of the compression type, the combination of a driven member, a hydraulic torque converter including an impeller, a multistage turbine and permanently stationary reaction means operatively related to the turbine, an overrunning clutch interposed between the turbine and driven member, an intermediate shaft connected to the driven member, a common member connectible to the engine, first and second hydraulically actuated clutches carried by the common member for respectively connecting the engine to the impeller and the intermediate shaft to provide hydraulic and direct drive, selector valve means adapted in one position to direct actuating fluid to the first clutch for engagement thereof and deny actuating fluid to the second clutch, in another position to direct actuating fluid to the second clutch for engagement thereof and deny actuating fluid to the first clutch, and in another position to direct actuating fluid to both clutches to engage the same whereby is obtained a braking effect due to the engine compression and the operation of the converter when the driven member is applying power to the intermediate shaft, and a master valve located in anterior flow relation to the selector valve means and shiftable between positions admitting and interrupting flow of the fluid to the selector valve means in any position thereof.

3. In a transmission for a vehicle powered by an engine of the compression type, the combination of a driven member, a hydraulic torque converter including an impeller, a multistage turbine and permanently stationary reaction means operatively related to the turbine, an overrunning clutch interposed between the turbine and driven member, an intermediate shaft connected to the driven member, first hydraulically actuated clutch means for connecting the impeller to the engine to provide hydraulic drive, second hydraulically actuated clutch means for connecting the intermediate shaft to the engine to provide direct drive, selector valve means adapted in one position to direct actuating fluid to the first clutch means for engagement thereof and deny actuating fluid to the second clutch means, in another position to direct actuating fluid to the second clutch means for engagement thereof and deny actuating fluid to the first clutch means, and in another position to direct actuating fluid to both clutch means to engage the same, and means connecting both clutches when simultaneously engaged whereby is obtained a braking effect due to the engine compression and the operation of the converter when the driven member is applying power to the intermediate shaft.

4. In a transmission for a vehicle powered by an engine of the compression type, the combination of a driven member, hydraulic, torque multiplying, power circuit means including a stationary housing and having a terminal over-running clutch connection to the driven member, first clutch means for connecting the power circuit means to the engine to provide hydraulic drive, an intermediate shaft connected to the driven member, second clutch means for connecting the engine to the shaft to provide direct drive, the connections of the first and second clutch means to the engine being mutually exclusive, respectively, whereby power is transmitted through either the first or second clutch means when the engine is applying power to the transmission and means for simultaneously engaging the first and second clutch means including a connection therebetween when the driven member is applying power to the intermediate shaft whereby the vehicle is subjected to a dual braking effect arising from the engine compression and the operation of the power circuit means.

5. In a transmission for a vehicle powered by an engine of the compression type, the combination of a driven member, hydraulic, torque multiplying, power circuit means including a stationary housing and having a terminal overrunning clutch connection to the driven member, first and second clutches independently operable for connecting the engine to the power circuit means and to the driven member to provide hydraulic and direct drive, respectively, and means for simultaneously engaging the first and second clutches when the driven member is applying power to the transmission including a connecting means between the clutches whereby the vehicle is subjected to a dual braking effect arising from the engine compression and the operation of the power circuit means.

6. In a transmission for a vehicle powered by an engine of the compression type, the combination of a driven member, hydraulic, torque multiplying, power circuit means including a stationary housing and having a terminal overrunning clutch connection to the driven member, a common member connectible to the engine, first and second clutch means carried by the common member and independently operable whereby power is transmitted through either the first or second clutch means to provide hydraulic or direct drive, the first and second clutch means being respectively connectible to the power circuit means and the driven member when the engine is applying power to the transmission, and means for simultaneously engaging the first and second clutch means when the driven member is applying power to the transmission whereby the vehicle is subjected to a dual braking effect arising from the engine compression and the operation of the power circuit means.

References Cited in the file of this patent

UNITED STATES PATENTS

| | | |
|---|---|---|
| 2,369,369 | Peterson et al. | Feb. 13, 1945 |
| 2,535,300 | Le Tourneau | Dec. 26, 1950 |
| 2,544,551 | Black | Mar. 6, 1951 |

FOREIGN PATENTS

| | | |
|---|---|---|
| 500,311 | Great Britain | Feb. 7, 1939 |